United States Patent [19]

Hailey et al.

[11] Patent Number: 4,707,212
[45] Date of Patent: Nov. 17, 1987

[54] AUTOMATED TAPE LAYING MACHINE FOR COMPOSITE STRUCTURES

[75] Inventors: Samuel I. Hailey; John W. Alden, both of Fort Worth, Tex.

[73] Assignee: The United States of America as represented by the Secretary of the Air Force, Washington, D.C.

[21] Appl. No.: 856,544

[22] Filed: Apr. 28, 1986

[51] Int. Cl.⁴ .......................... B32B 31/18; B31F 1/00
[52] U.S. Cl. .................................. 156/361; 156/523; 156/574
[58] Field of Search ................ 156/523, 527, 574–577, 156/353, 361, 522, 505, 506

[56] References Cited

U.S. PATENT DOCUMENTS

| 3,810,805 | 5/1974 | Goldsworthy et al. | 156/361 |
| 4,043,855 | 8/1977 | Patin | 156/178 |
| 4,234,374 | 11/1980 | Frank | 156/459 |
| 4,259,144 | 3/1981 | Ballentine | 156/522 |
| 4,382,836 | 5/1983 | Frank | 156/574 X |
| 4,508,584 | 4/1985 | Charles | 156/353 |

Primary Examiner—David Simmons
Attorney, Agent, or Firm—Jules J. Morris; Donald J. Singer

[57] ABSTRACT

An automatic tape laying device for applying structural tape 24 to an underlying structure in order to fabricate a composite part. The tape laying device comprises a tape laydown head 10 and a plotting mechanism 60. The tape laydown head has two tape laying rollers 12, 14 arranged side by side and independently controlled. Generally, the tape laying rollers 12, 14 apply tape sequentially to a form as when the tape head is being moved back and forth. The tape head is oriented with a rotary orientation mechanism 90. A separate supply structure 70 parallel to the tape head 10 houses tape supply reels 76, 78 and tape cutting means 84, 86.

13 Claims, 7 Drawing Figures

AUTOMATED TAPE LAYING MACHINE FOR COMPOSITE STRUCTURES

STATEMENT OF GOVERNMENT INTEREST

The invention described herein may be manufactured and used by or for the Government for governmental purposes without the payment of any royalty thereon.

TECHNICAL FIELD

This invention is related to the manufacture of lightweight graphite composite structures. It is particularly related to automated devices for laying structural tape during manufacture of composite parts.

BACKGROUND OF THE INVENTION

Composite structures are gaining more and more useage in modern aircraft, automobiles and other devices where lightweight parts of high strength are desired. These applications are feasible because of the high mechanical strength and machinability associated with composite parts, particularly those manufactured from graphite epoxy mixtures. Testing has shown that in many applications graphite epoxy parts are substantially stronger and more reliable than comparable metal parts.

In view of the above, there is increasing interest in efficient manufacture of such composite parts. One method of manufacturing complex composite designs is through the use of graphite epoxy tape (i.e., structural tape) which is positioned on a basic structure and then cured to form a high strength finished part which can be machined as desired.

Composite parts are most frequently used for aircraft components; close inspection of aircraft wings and tails reveals that even the largest of such aircraft components are comprised of many small details. As a result, it is rarely possible to lay straight lengths of structural tape greater than three feet. Since multiple layers of tape are often required, and aircraft components require a great many pieces of tape due to the short tape course length, hand laying of such individual aircraft components is a long labor intensive job.

Machines have therefore been developed to automatically lay tape to form composite structures. An example of an automatic tape laying machine can be found in U.S. Pat No. 3,810,805 to Goldsworthy et al. The tape laying machine disclosed in the Goldsworthy patent is a straight forward device which is useful to review when considering the problems encountered during use of automated tape laying machines.

The Goldsworthy machine uses conventional three inch wide tape to laminate an underlying structure. Use of such wide tape makes it very difficult to properly laminate parts having small details. Therefore, required details would have to be added or machined onto the part after lamination. In addition to obscuring details, use of wide tape produces a great deal of unuseable scrap tape pieces and makes it difficult to accurately orient the tapehead to follow part contour.

A second problem with this conventional tape machine is that after each single layer of tape is applied, the tape laying head must either be retracted and returned to an arbitrary initiation point or rotated 180° and indexed. As a result, a great deal of time is lost indexing and orienting the tapehead rather than actually laying tape. In such devices, up to two-thirds of machine operation time is spent in non-tape laying operations. Further, minor orientation errors which result in overlaps or gaps between adjacent tape layers are more likely after reorientation and indexing.

Finally, another consideration is the massive nature of the Goldsworthy device. This device calls for a great deal of components to be installed on the movable tape head. Head positioning therefore requires heavy duty actuators and motors. The massiviness of such a device mitigates against rapid and efficient movement of the tape laying head.

In view of the above it is an object of this invention to provide an automatic tape laying machine having a lightweight tape laying head arranged to reduce machine time spent in non-tape laying operations.

Further, it is an object of this invention to provide a tape laying machine that is capable of increased flexibility of orientation to the various contours required for tape laying on complex composite parts.

Finally, it is an object of the present invention to provide a tape laying machine that is capable of accurately laying strips of tape while minimizing overlaps, gaps, and tape wastage.

SUMMARY OF THE INVENTION

The invention comprises an automated tape laying machine, for laying tape on a composite structure. The tape laying machine has a tape laying head with dual tape laying rollers arranged to roll in opposite directions. This eliminates the need for rotation of the tape laying head after each a course of tape is laid. The tape laying head also comprises vertical positioning means for raising and lowering each of the dual rollers individually. The number of tape storage and routing components placed in the tape head has been minimized in order to lighten the tapehead structure and make rapid and precise tape head movement possible.

In the preferred embodiment of the present invention the automatic tape laying machine comprises a plotting mechanism for positioning a platform above a composite structure. The tape laying head is mounted on the plotting mechanism platform which is capable at controlled movement in two directions.

A further aspect of the preferred embodiment comprises a supply carriage having dual supply reels for supplying tape through tape guides to each of the tape laydown rollers. The moveable supply carriage mounted adjacent to the plotting structure and can move parallel to the plotting platform.

It is also preferred that a cutting means be provided at the tape supply carriage for shearing tape material prior to its attachment to the composite structure. In this way, folding of the tape during complex movements of the head is eliminated since each layer of tape is neatly cut. The automated tape laying device utilizes narrow width tape to increase machine flexibility and reduce wastage.

The preferred method of operation for the automated tape laying machine is as follows: (1) a first layer of tape is laid upon the composite structure, or structure form, by a first laydown roller, (2) the first roller is lifted from the structure, (3) the second roller is then lowered, and (4) the tape laying head runs in reverse to laydown a second layer of tape. This process is repeated until the correct number of layers have been added to the form. After tape laying is completed at a particular location, the head is indexed to its next position and the process is repeated. From time to time the orientation angle of the head is adjusted to the contour of the composite structure being built up.

BRIEF DESCRIPTION OF THE DRAWINGS

The foregoing and other objects and advantages of the invention will be apparent from the following more particular description of the preferred embodiment of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE INVENTION

Figure 1:
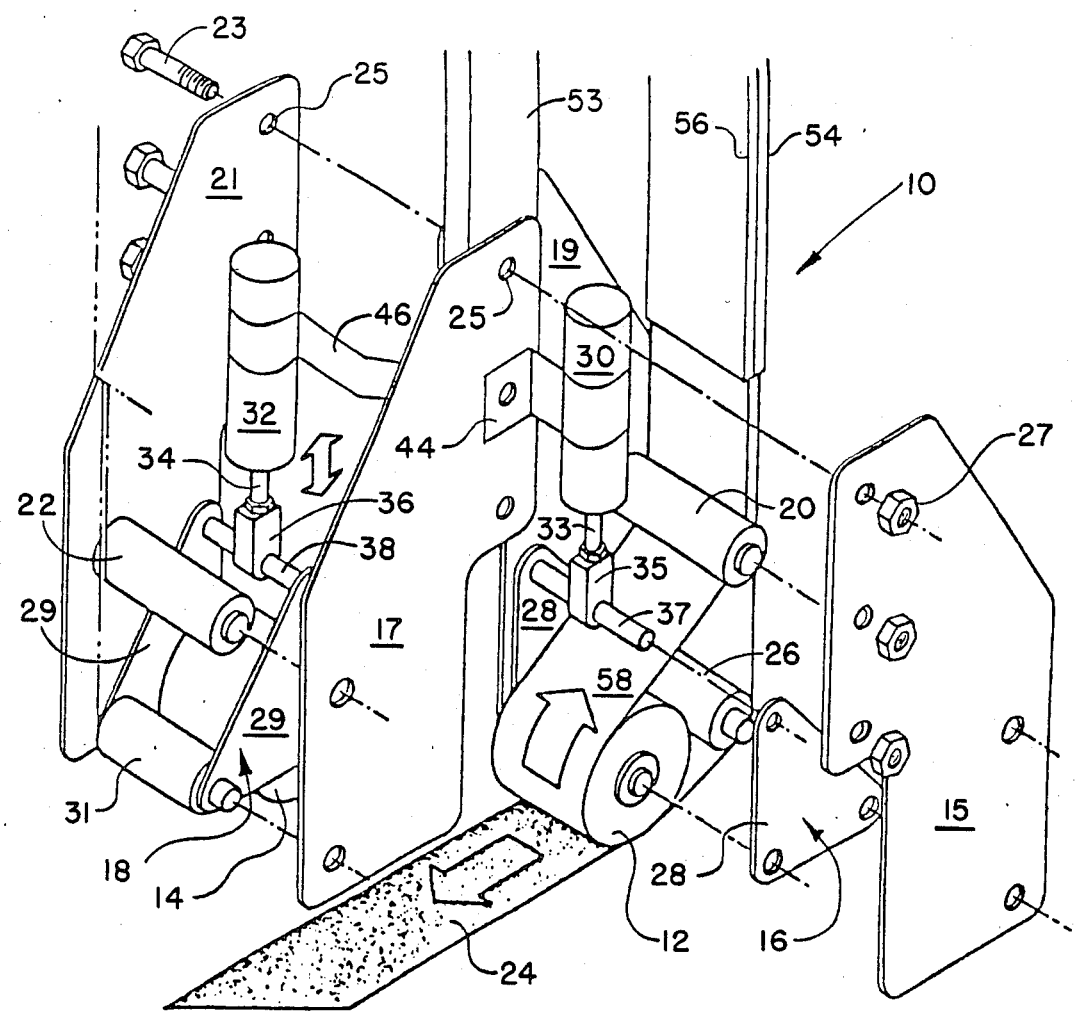
FIG. 1 is an exploded perspective view of an automated tape laying machine head incorporating the principles of this invention.
Figure 2:
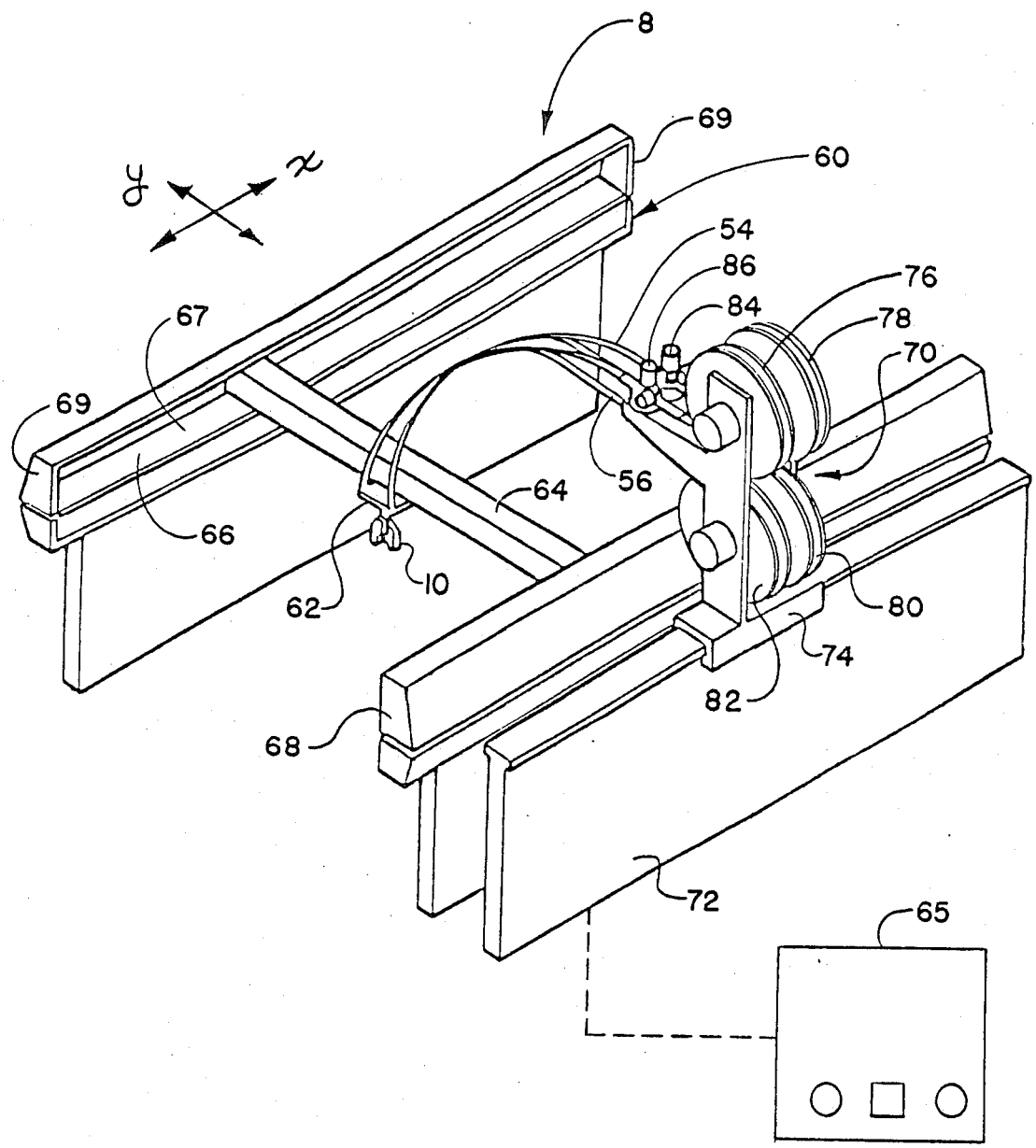
FIG. 2 is a perspective view of an automated tape laying machine incorporating the tape laying head of FIG. 1.
Figures 3, 4:
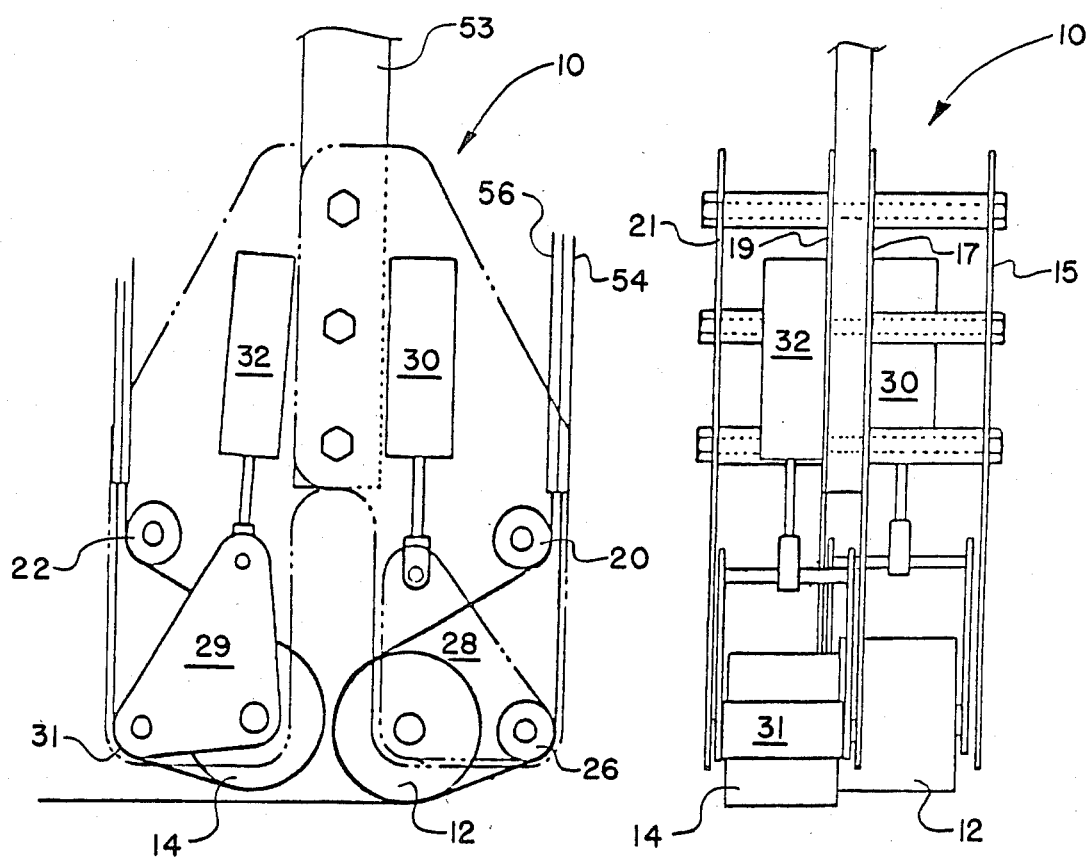
FIG. 3 is a side view of the tape laying head of FIG. 1 showing routing of tape through dual rollers.
FIG. 4 is a front view of the tape laying head of FIGS. 1 and 3.

An automated tape laying machine 8 for constructing composite structures is shown in the view of FIG. 2. FIGS. 1, 3 and 4 specifically show a tape laying head 10 used to apply structural tape to an underlying composite structure while FIG. 2 shows the tape laying machine 8 into which the tape laying head 10 is incorporated.

The tape laying head 10 incorporates dual tape laydown rollers 12 and 14. The two rollers are utilized to reduce machine time spent orienting and indexing the head 10 during machine operation. The rollers 12, 14 are operated independently and are run in opposite directions so that the head 10 needs only to be is indexed after every other tape row is completed. Reorientation of the head is only required when the contour of the underlying structure requires it.

The tape laydown head structure is primarily comprised of four side plates 15, 17, 19, 21 which are preferably manufactured from composite material. A pair of tape routing upper rollers 20 and 22 are rotatably attached to sideplate pairs 15, 19, and 17, 21 respectively. The tape head structure is assembled by the use of three bolts 23 which pass through holes 25 in the sideplates 15, 17, 19, 21 and are secured with nuts 27. This makes for a rigid structure in which the separation between rollers 12 and 14 does not vary.

Each of the laydown rollers 12 and 14 is associated with a vertical positioning assembly 16, 18. The vertical positioning assemblies are each connected to the tape head structure 10.

Vertical positioning assembly 16, comprises two side plates 28 holding laydown roller 12 and guide roller 26. Vertical positioning assembly 18 similarly comprises two side plates 29 holding laydown roller 14 and guide roller 31. All the rollers are rotatably attached to the side plates in order to permit movement of the tape. The guide rollers 26, 31 route the structural tape 24 across the cylindrical surface laydown of rollers 12 and 14 for application to a composite structure.

Vertical positioning of the laydown rollers is accomplished through use of pneumatic cylinders 30, 32. The pneumatic cylinders 30, 32 are fixedly attached to the side plates 28, 29 respectively and through them act to raise and lower the laydown rollers 12, 14.

Shafts 33, 34 extending from pneumatic cylinders 30, 32 connect to tie brackets 35, 36. The tie brackets firmly hold rollpins 37, 38 that are joined to the tie plates 28, 29. Both vertical positioning assemblies including the tape laydown rollers are moved vertically by operation of the pneumatic cylinders 30, 32 as described below. Air lines the pneumatic cylinders are not shown in order to simplify FIG. 1. The pneumatic cylinders of the vertical positioning assemblies are held steady by brackets 44, 46 which are attached to tape head sideplates.

Orientation of the tape head structure is controlled through a mounting shaft 53. The mounting shaft is connected to an orientation structure 90, discussed in reference to FIGS. 4, 5 and 6.

The tape 24 is routed to the tape head by means of tape feed and paper return guides 54 and 56. For clarity, neither the tape guides nor the epoxy tape are shown on the left side of FIG. 1 but are similar to those shown in reference to roller 12.

The tape 24 is laid and the backing paper 58 is stripped at the laydown rollers. The backing paper 58 is then fed back to the paper return guide 56 for routing back to a paper tape-up reel. The tape is preferably pressure laid graphite epoxy tape of one inch width. The standard conventional tape is generally three inches wide, this reduction in tape width allows for a closer and more correct contouring of small details when laying laminations.

The tape laydown rollers each have independent controls which enable them to be independently actuated to lay tape in opposite directions (in FIGS. 1 and 3). The mechanism as a whole can be controlled by a conventional microprocessor 65 (FIG. 2) such as those manufactured by the Digital Equipment Corporation or Hewlett Packard Corporation. The microprocessor is programmed with the complete dimensions of the composite structure being laminated so that the tape laying head can be automatically oriented, and indexed to lay the proper tape courses for the desired final structure. Operation of the head can be more readily understood with reference to FIG. 2.

FIG. 2 shows the overall structure of the automated tape laying machine which is preferably positioned above an underlying structure, or form, upon which tape is to be applied. The tape laying machine plotting structure 60 primarily comprises a tape head platform 62 upon which is mounted the tape head 10.

The tape platform 62 can move to any position on the plane defined by crossbar 64 and side rods 66 and 68. The tape head platform 62, therefore, can move freely in the "y" direction (on the crossbar 64) in between side members 66 and 68. Cross member 64 can move in the "x" direction within slot 67 of side member 66 and a similar slot (not shown) in side member 68. The cross member 64 therefore has full freedom of movement in between end walls 69 of the side members.

In this device, most tape head accessories are placed on an independent gantry, or supply structure, 70. Supply accessories mounted on the supply structure base 74 include four large reels. The top two reels 76, 78 are supply reels for supplying tape to the tape head rollers 12 and 14 while the bottom reels 80, 82 are paper takeup reels which reel up the tape backing paper after the tape has been applied to the composite structure. Tape supply guides and the paper return guides 54, 56 separate from each other adjacent to the supply structure so that they may properly feed the supply and return reels.

The tape supply structure 70 sits on a monorail 72 that is parallel to the side rails 68, 66 of the plotting structure 60 and allows the structure to move in the 'x' direction, parallel to the movement of crossbar 64.

Shears 84, 86 are positioned at the supply end of the tape guides to precut tape strips prior to their installation on the form. These shears are used to cut through the tape (but not the backing paper) so that tape strips can be routed through the rollers and applied directly to a composite structure. Precutting the tape avoids doubling over of the tape when the laydown head changes direction.

During operation of the laydown head, supply structure 70 moves in a fixed relationship to the movement of crossbar 64. The crossbar and supply structure therefore travel together from one end of the plotter structure to the other along the x axis. When the platform moves along the 'y' axis, to the left or right, no movement of the supply structure is required. The tape and paper guides 54, 56 are sufficiently flexible so that the tape and paper are properly guided to the tape laying head at all possible 'y' axis positions.

Since the supply structure carries most of the accessories for the tape laying head, there is room for additional desirable accessories at the tape laying platform 62. Examples of desirable accessories which provide enhanced automated operation include fiber optical or electronic inspection systems to constantly monitor tape application and tape tack enhancement devices such as thermal, ultrasonic or chemical activators.

Figure 5:
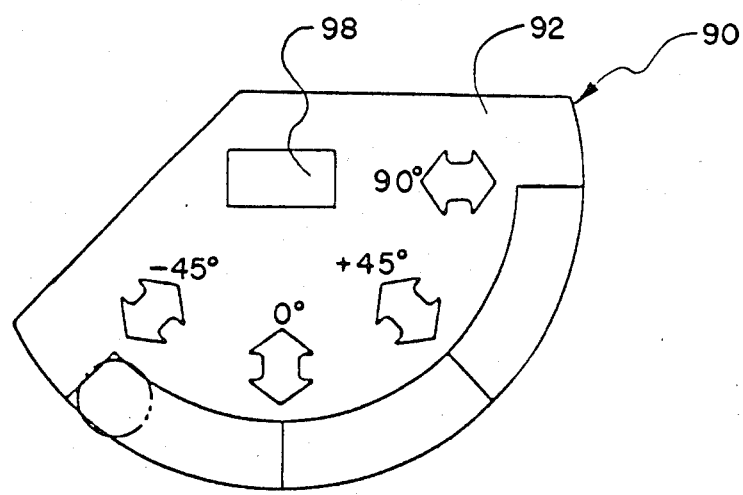
FIG. 5 is a top view of an orientation adjustment mechanism for the tape laying head of FIG. 1.
Figure 6:
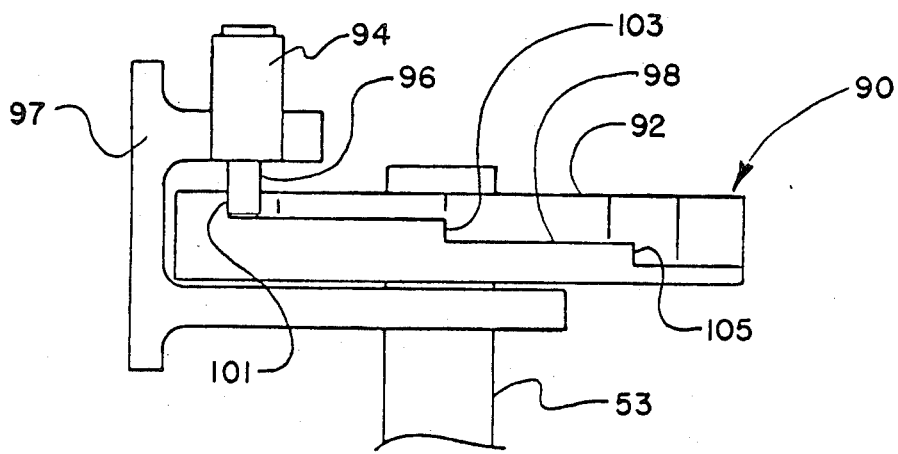
FIG. 6 is a side view of the orientation adjustment mechanism of FIG. 5.

The tape laying head orientation fixture is shown in FIGS. 5 and 6. This fixture is used to adjust the head for changes in the contour and direction of the underlying structure upon which the tape is applied.

The orientation structure 90 comprises a rotatable positioning wheel 92 holding the mounting shaft 53 (FIGS. 1 and 6) of the tape head. The shaft 53 is fixedly attached to the orientation mechanism at square notch 98. A pneumatic cylinder or solenoid 94 is used to restrain the rotatable orientation disk 92. The cylinder shaft 96, when deployed, applies pressure on stepped surface 98 of the orientation disk 92 to arrest orientation disk rotation at a desired head orientation. Both the solenoid and wheel are supported by a tape laying head bracket 96 which is affixed to tape head platform 62 (FIG. 2).

This orientation head 90 is particularly designed for a quick reorientation of the tape laying head at selected angles for which steps 101, 103, 105 are provided. The orientation head, however, can be used to orient the head at any angle between the steps. The disk 92 is rotated either manually or by an electric stepping motor to change tape laydown head orientation. When an electric stepping motor is used laydown head orientation can be controlled by the microprocessor 65 (FIG. 2). This precise adjustment is necessary to properly orient the tape laying head for changes in the composite structure without causing overlap or gapping between adjacent courses of tape.

METHOD OF OPERATION

The tape laying device of this invention is designed to minimize time consuming non-tape laying functions. In order to provide maximum tape laying time and a high tape laying speed, dual rollers are used and heavy components are removed from the immediate vicinity of the tape laydown rollers.

Figure 7:
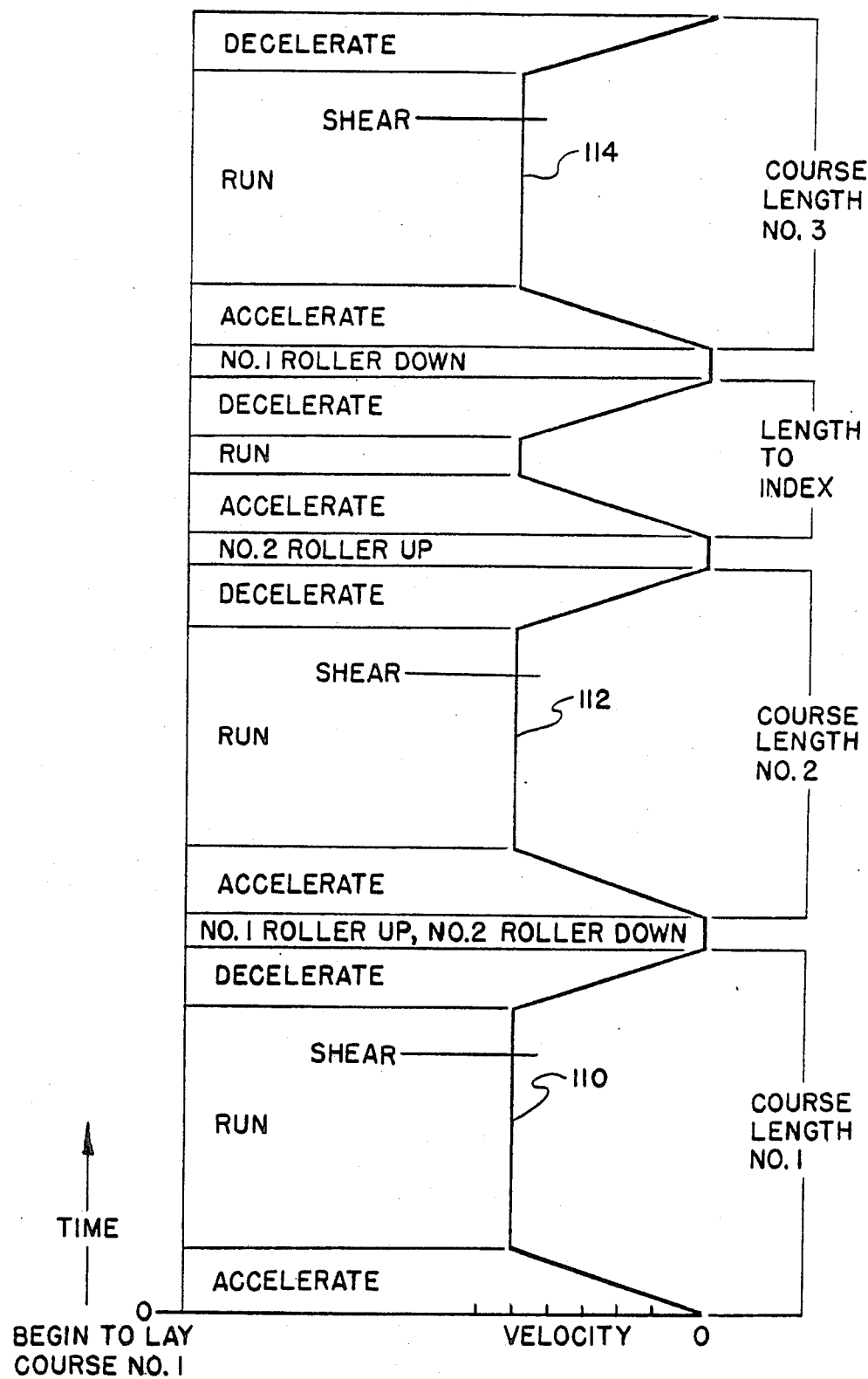
FIG. 7 is a graph showing tape head operation by plotting time versus head velocity.

Detailed operation of the roller may be most clearly understood with reference to the graph of FIG. 7. The horizontal axis of the graph represents velocity; the vertical axis represents time and the start of machine operation (time=0) is at the base of the graph.

On the right side of the graph the amount of time during which the tape head is operating to laydown its first course of tape is shown in the brackets labelled "Course length No. 1". In the lowest section of the graph the tape head is accelerating to its running speed. The vertical section of line 110 represents the constant running speed of the head. The head then decelerates towards the end of its first tape laying course and roller No. 1 is lifted from the composite structure after the previously sheared end of the tape is layered onto the structure.

Roller No. 2 is next lowered to the composite structure and the tape head is accelerated in the reverse direction (180° opposite) to its constant running speed 112 before decelerating again and stopping (brackets labelled "Course length No. 2"). Thus, the second course of the tape has been laid without reorientation or indexing of the tape head.

After the second course of tape has been laid roller No. 2 is lifted by the pneumatic cylinder. The tapehead is then indexed as shown by the acceleration, run and deceleration segment labeled "length to index". After tape head indexing has been completed, roller No. 1 is lowered and course length No. 3 (at 114) is applied to the composite structure. A fourth course length can then be applied without further indexing of the tape laying head.

Minimizing the amount of tape head indexing required (only once every other tape course) minimizes the chances of tape gap and overlap error. Further overlap and gap error is also reduced because of the fixed positioning of the first and second rollers relative to each other, and because no accummulated error results from unnecessary 180° head rotation.

The automatic narrow tape laying machine has several distinct advantages over conventional devices. Since the device minimizes non-tape laying operations it provides a more efficient, lower cost manufacturing process for laminating composite structures. The use of narrow one inch tape maximizes material utilization and reduces tape scrap since the tape head can be easily oriented and indexed to follow small details on the composite structure. Further, due to the great increase in flexibility stemming from the use of a fully adjustable tape laying head and narrow tape, handwork is largely eliminated.

Use of the automated tape laying machine with a microprocessor control permits repeatable manufacture of composite structures. Once an initial structure is completed and the microprocessor is properly programmed a great many interchangeable, identical composite structures can be manufactured with little or no additional input from the operator. Use of automated devices greatly increses tape laying uniformity.

This device can also accommodate flexible manufacturing systems. Changing programs in the microprocessor control unit 65 that drives the plotter 60 and the tape head 10 permits use of the automated tape laying machine for an infinite variety of composite structures. Further, composite structure design changes can be easily introduced with little delay by just reprogramming the microprocessor.

Another advantage stemming from the use of this automated device is reduced contamination from hand layout of tape. Dirt and debris generally associated with hand layout of laminates are completely eliminated by use of automation in a sterile environment. This makes for improved structural laminants with fewer adhesive flaws.

Finally, the operational versatility of this device increases the feasibility of manufacturing complex components from structural composites.

While the invention has been described with reference to the preferred embodiment thereof, it will be understood by those skilled in the art that various changes in substance and form may be made therein without departing from the spirit and scope of the invention as defined in the appended claims.

What is claimed is:

1. An automated machine for laying tape upon a form comprising:
    (a) a guide mechanism for positioning a movable plotting platform above the form to be laminated;
    (b) a movable parallel supply structure separate from said movable plotting structure for supplying the tape;
    (c) a tape laying head mounted upon said movable plotting structure for laying the tape on the form, the tape laying head comprising:
        (i) two side by side tape laydown rollers for pressing said tape onto the form;
        (ii) a vertical positioning mechanism for raising and lowering each of said rollers individually; and
        (iii) tape routing means for routing the tape onto said roller; and
    (d) a flexible tape guide for directing tape from said supply structure to said tape laying head.

2. The automated machine of claim 1 wherein said vertical positioning mechanism comprises pneumatic cylinders for raising and lowering said laydown rollers individually and independently.

3. The automated machine of claim 1 wherein said two laydown rollers are each used for laying the tape in different directions relative to the orientation of said tape laying head.

4. The automated machine of claim 1 wherein the tape used in said tape laying machine comprises tape material and tape backing paper.

5. The automated machine of claim 4 further comprising shears for cutting said tape in order to lay strips of said tape said shears positioned to cut through said tape material but not through said tape backing paper so as to permit continuous tape routing.

6. The automated machine of claim 5 further comprising tape supply reels positioned upon said parallel supply structure.

7. The automated machine of claim 6 wherein said shears are mounted adjacent to said tape supply reels on said parallel supply structure.

8. The automated machine of claim 1 wherein said parallel supply structure comprises positioning means for movement along an axis coinciding with movement of said movable plotting platform.

9. The automated machine of claim 4 wherein said tape guides are associated with return guides for returning said tape backing paper to said supply structure.

10. An automated tape laying device for composite structures comprising:
    (a) a plotting mechanism for precise movement of a platform above a form;
    (b) a tape laying head positioned on said platform comprising:
        (i) dual tape laydown rollers for laying tape on the form;
        (ii) vertical positioning means for raising and lowering each of said dual rollers individually, and
        (iii) tape guide means for directing the tape to said laydown rollers;
    (c) a separate movable supply carriage for supplying the tape to said tape laying head; and
    (d) tape head orientation means for changing tape laydown angle relative to the form.

11. The automated tape laying device for composite structures as defined in claim 10 wherein said movable supply carriage further comprises dual supply reels for supplying the tape to each of said tape laydown rollers independently.

12. The automated tape laying device as defined in claim 10 further comprising shears for cutting through said tape but not through a tape backing in order to continuously lay strips of said tape on the form.

13. The automated tape laying device as defined in claim 10 wherein said dual laydown rollers are side by side, lay tape in 180° opposite directions and operate independently of each other.

* * * * *